United States Patent [19]
Tucker

[11] Patent Number: 5,465,477
[45] Date of Patent: Nov. 14, 1995

[54] METHOD OF ASSEMBLING A HEAD ARM STACK FOR A MAGNETIC DISK DRIVE

[75] Inventor: Larry E. Tucker, Fremont, Calif.

[73] Assignee: Read-Rite Corporation, Milpitas, Calif.

[21] Appl. No.: 231,402

[22] Filed: Apr. 22, 1994

[51] Int. Cl.⁶ .................................................... G11B 5/127
[52] U.S. Cl. ................................................ 29/603; 29/760
[58] Field of Search ............................ 29/464, 603, 737, 29/760; 360/106

[56] References Cited

U.S. PATENT DOCUMENTS

| | | | |
|---|---|---|---|
| 4,854,036 | 8/1989 | DiGregorio | 29/603 X |
| 5,119,537 | 6/1992 | Hamanaka et al. | 29/603 |
| 5,265,325 | 11/1993 | Fortin | 29/603 X |

*Primary Examiner*—S. Thomas Hughes
*Attorney, Agent, or Firm*—Nathan N. Kallman

[57] ABSTRACT

A method of assembling a head stack on a pivot bearing for use in a head positioning mechanism of a disk drive in which a plurality of different head stack components are clamped on the bearing comprises providing a plurality of head stack components, each having an opening for receiving the bearing. The head stack assembly includes two pairs of head arms, spacers and a flat coil member. A caddy positions the components with their respective openings disposed on a common axis. The head arm assemblies are positioned in the caddy with the openings biased against each other and disposed on the common axis. The flat coil member is placed between the pairs of arm assemblies with its opening on the common axis. The head stack components in the caddy are angularly aligned on the common axis. A threaded end of the bearing is inserted through the openings and receives a clamping nut which is tightened to clamp the components on the bearing for conjoint movement with the flat coil component. The caddy is then removed.

9 Claims, 6 Drawing Sheets

FROM FIG 6A

ALIGN BEARING RECEIVING
OPENINGS ON COMMON AXIS
AND SELECTED COMPONENTS
ANGULARLY ON AXIS
RELATIVE TO A REFERENCE

INSERT THREADED END OF
BEARING THROUGH OPENINGS,
ATTACH NUT AND TIGHTEN
TO CLAMP COMPONENTS TIGHT

REMOVE CADDY FROM BASE
AND TRANSFER TO DISK
FILE ASSEMBLY

METHOD OF ASSEMBLING A HEAD ARM STACK FOR A MAGNETIC DISK DRIVE

FIELD OF INVENTION

This invention relates in general to methods of assembling a stack of magnetic head arm assemblies for use in a disk file data storage device.

DESCRIPTION OF RELATED ART

The prior art discloses various types of disk files that are employed to store data in data handling systems. A disk file comprises generally one or more disks each having a magnetic surface for storing data. The disks are mounted on a spindle and continually rotated at a constant speed. At least one magnetic transducer is mounted on a head arm assembly. The transducer is associated with the magnetic surface of the disk and is movable by an actuator to preselected concentric recording tracks under the control of an address signal supplied to the actuator from the data processing system. The transducer is biased toward the disk surface and is spaced therefrom by a film of air as the disk is rotated. This type head is sometimes referred to in the art as an air bearing head. The transducer is supplied with data signals during the data storage operation. During reading of stored data the transducer senses the magnetic transitions which are converted to data for use by the system.

Disk file configurations vary in the number of disks employed, the size of the disks, and the type of actuators that are employed to position the magnetic head to an addressed recording track. Since total storage capacity of a disk file is an important parameter, most file configurations employ a plurality of disks mounted on a common spindle, with each disc surface having a separate magnetic transducer associated with it.

Two general types of electromagnetic actuators have been used for positioning the magnetic heads. One type is a linear actuator wherein the heads are moved during the track accessing operation in a straight line which generally follows a radial line through the center of the spindle. The second type of actuator is referred to as a rotary actuator. This type actuator moves the head during the track accessing operation on an arc substantially normal to the tracks. In both actuators, the individually manufactured head arm assemblies that are associated with each disk surface must be assembled into a comb type structure with the transducers at the distal ends of the head arms accurately aligned vertically. In a similar fashion, the other ends of the arm assemblies must be attached to the actuator so that each arm moves over a corresponding path. The comb type structure is often referred in the art as the "head stack".

The personal computer and in particular the so called "laptop" models of personal computers, have imposed a size parameter on disk files which is in opposition to the currently desired capacity requirements for data storage. In effect, as the need for more storage capacity is increasing, the size requirements for disk storage drives is decreasing.

Disk diameter is the dominating factor in determining the footprint of the drive. The number of disks in the stack generally determines the height of the drive. In the last few years disk diameters for fixed disk drives used in personal computers have decreased from five and one-half inches to three and one-quarter and to one and one-eighth inches. Prototype disk files employing one inch disks are discussed currently in the literature. The decrease in size has had little or no impact on storage capacity, in that the various technologies which directly affect capacity, such as linear recording density and track density, have been substantially improved. Also, disk drive configurations now can employ more disks in a given height, since a decrease in the spacing between disks is made possible by improvements in head arm structures.

A major effect of the decrease in size has been the inability to employ conventional assembly practices in the construction of these smaller disk files. This is particularly true of the comb type head arm assembly, i.e. the head stack, which is the movable part of a rotary type actuator that positions the magnetic transducers during track accessing operations. Prior art assembly operations of the stack involved providing a guide hole in the actuator end of the head arm. Each head arm assembly was sequentially placed on a shaft with suitable ring type spacers between each arm. Each arm was affixed to the shaft by swaging or crimping the material defining the hole. Since the head arms were relatively sturdy, the damage to these members was minor and the swaging operation did not generally adversely affect the assembly. These head arm assemblies were also relatively large so the operator with average dexterity experienced no difficulty in sequentially assembling the head stack.

With the decrease in size, the head arms became less sturdy and hence were more sensitive to the swaging operation with the result that the alignment of the heads was adversely affected. In addition the individual components on the head arm became more fragile and were easily damaged if extreme care was not exercised during the assembly operation. In addition, if one head arm proved, on testing of the head stack, to be out of specification, the rework operation to replace the bad head arm or to salvage the good head arms was very complicated and not very cost effective. The above described problems were overcome by modifying the head arm to allow a plurality of head arms to be mechanically clamped on the pivot bearing assembly of the rotary actuator. In accordance with the modified design a generally rectangular relatively thin mounting plate, having an opening for receiving the spindle bearing, was spot welded to the end of the head arm remote from the transducer. The center section of the head arm is spring type material in order to bias the head toward the disk during operation. The head arm assembly therefore has a slight bend in the central area of the spring material which produces the biasing effect during operation.

One end of the spindle bearing-assembly is provided with threads which screw into the base plate of the drive after the head stack is assembled. The pivot bearing on which the stack components are mounted is disposed on the spindle. The components that are disposed on the bearing assembly for a four transducer head stack would include, for example, two pairs of head arms, a spacer for each pair of head arms, a flat coil support member and a bracket for supporting the flexible printed circuit member. The circuit member electrically connects the read/write electronics in the drive to the magnetic transducers. A clamping nut is screwed on to the threaded end of the bearing assembly and clamps the components together. The head stack including the flat coil member of the actuator is then positioned in the actuator located on the base plate of the drive.

In order to assist the person assembling the head stack employing the modified head arm assemblies, an assembly jig was employed by the operator during the assembly process. The assembly jig included a separate vertical pocket for each head arm which allowed each head arm to be roughly positioned on a side edge with the axis of the opening in the end of the head arm designed to receive the spindle disposed horizontally. Assuming that four head arms were to be assembled on the bearing, the operator would place the first head arm in the proper pocket in the cradle and then insert one end of the pivot bearing through the opening in the end of the head arm while slipping on a spacer ring. The function of the ring was to separate adjacent head arms. The operator would then place another head arm in the adjoining pocket and feed the end of the bearing through the opening in the end of the head arm. The flat coil supporting member was then slid onto the bearing.

The previous steps were repeated for the remaining head arms. Each head arm was maintained loosely in its desired position until the clamping operation which clamped the components together. Prior to clamping the components of the head stack together, removable spacers were inserted and maintained between the distal ends of the head arms to prevent contact and damage to the magnetic transducers, since the heads were in face to face relationship during the clamping step and biased toward each other.

In order to align the components before clamping, the operator manually inserted a pin into a registration hole provided in the distal end of each head arm. Once the pin had aligned the head arms, a predetermined area on the edge of the head arm was referenced to a point on the jig so that the heads were referenced to the axis of the pivot bearing. A datum point on the coil member was also referenced to a reference point on the jig. The nut was then placed on the end of the bearing and torqued to a preset clamping force. After the alignment pin was removed, the resulting head stack and jig were than transported to the drive assembly operation, which in practice, was often at an entirely different manufacturing location.

It can be seen that the above process requires an operator having substantial skill and dexterity to minimize damage to the various components of the head stack. As the various parts have become smaller, the yield of the assembly operation has decreased to the point that the prior art assembly process is no longer economically feasible.

SUMMARY OF THE INVENTION

An object of the present invention is to provide an improved method for assembling the head stack of a disk file actuator.

Another object of the present invention is to provide an improved method to assist an operator to clamp a plurality of head stack components for conjoint movement relative to the magnetic surfaces of a disk file.

A further object of the present invention is to provide an improved method of mechanically clamping a plurality of head stack components in which the components are in a predetermined relationship relative to each other.

Another object of the present invention is to provide an improved method of clamping head stack components on a spindle bearing assembly of a rotary actuator of a disk file.

In accordance with the assembly process of the present invention, an improved component caddy and caddy base combination are provided. The caddy includes separate partitions that are formed to receive and maintain each of the head arms in a slightly biased state so that the ends of a pair of adjacent head arms provide a clamping force on an inter-arm spacer. A partition is also provided for the flat coil mounting member. The partitions together with reference projections, which extend up from the caddy base, position the components with the centers of their respective bearing receiving openings disposed on a common horizontal axis.

The operator is responsible for first placing each head arm in its specified partition where each head arm is individually supported along its lower lengthwise edge by the bottom of the caddy base. This bottom surface effectively defines the bottom of the head arm receiving pocket to accurately position the head arm with the center of the bearing receiving opening disposed on the horizontal axis of the pivot bearing.

The operator next places the spacer components into their respective positions. Each spacer is maintained with the center of its bearing receiving opening disposed on the same horizontal axis by means of a clamping force exerted from the ends of the head arms. Lastly the operator places the flat coil support member of the actuator in a center pocket midway along the horizontal axis so that the same number of head arms are disposed on either side of the flat coil support member.

The component caddy and caddy base combination with the loaded components are then placed in fixture in which the spindle assembly of the rotary actuator including the pivot bearing assembly is held. The fixture is designed to move the bearing along the horizontal axis defined by the centers of the aligned openings of the components positioned in the caddy. When the end of the bearing is located through the stack components, a nut is placed on the threaded end of the pivot assembly and the nut is tightened to provide a preset clamping pressure on the components. The caddy is designed so that the head arms are properly aligned when the pivot nut is tightened. The caddy and base combination is then removed from the fixture, and the caddy with the clamped head arm assembly is separated from the caddy base and transferred for disk drive assembly.

When the head arm assembly and spindle are placed in the actuator, each pair of adjacent head arms is straddling a different disk so that when the caddy is removed the heads remain separated.

It can be seen that the method of the present invention overcomes many of the problems associated with the prior art method in that considerably less handling of the parts by the operator is required. The cooperation of the caddy with the reference projections on the caddy base to accurately position the components prior to clamping avoids much of the "fumbling" problem experienced by operators with normal dexterity and patience who need to hold small parts to hold in a precise position while attempting to execute other manual assembly steps.

BRIEF DESCRIPTION OF THE DRAWING

The invention will be described in detail with reference to the drawing in which.

DESCRIPTION OF THE PREFERRED EMBODIMENT

Figure 1:
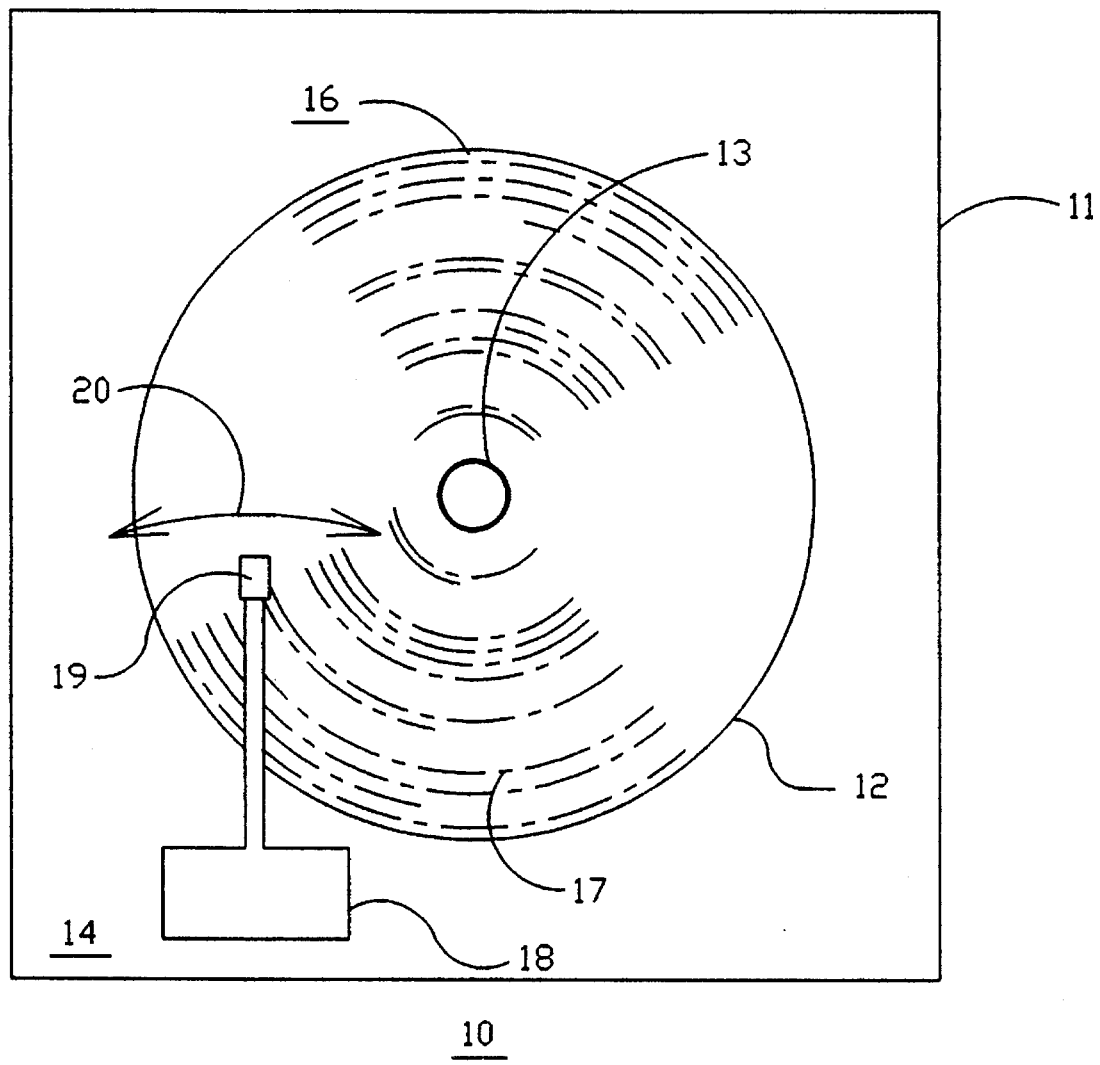
FIG. 1 is a schematic plan view of a disk drive showing the physical relationship of the magnetic disks, the rotary actuator and the head arm assembly.

As shown in FIG. 1, the disk drive includes a base plate 11 on which is mounted a plurality of magnetic disks 12 which rotate about an axis 13 that is normal to the surface 14 of the base plate 11. The disks 12 are normally rotated at a constant speed during the transfer of data to and from the disks by means of a motor (not shown) that may be positioned under the base plate 11. The disk surface 16 has a relatively large number of closely spaced concentric recording tracks 17.

The drive 10 as shown includes a rotary type actuator 18 for positioning the magnetic heads 19 relative to imaginary cylinders of recording tracks defined by tracks 17 on each of the recording surfaces of disks 12. Magnetic heads 19 are moved radially in an arc 20 across the surface of disk 12 during a track accessing operation.

Figure 2:
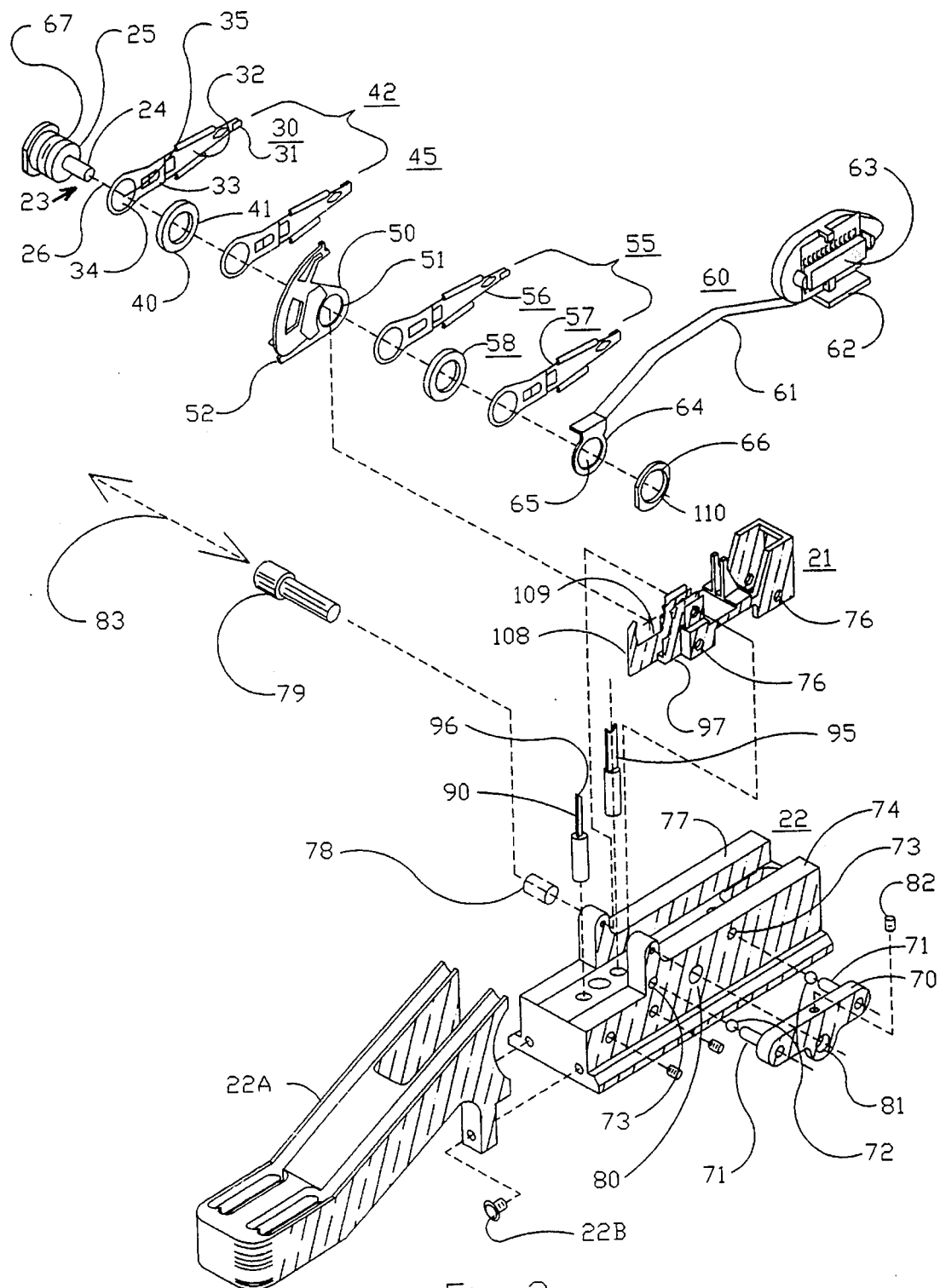
FIG. 2 is an exploded perspective view of the head stack components prior to being assembled, and the caddy and caddy base employed in the method of the present invention.
Figure 3:
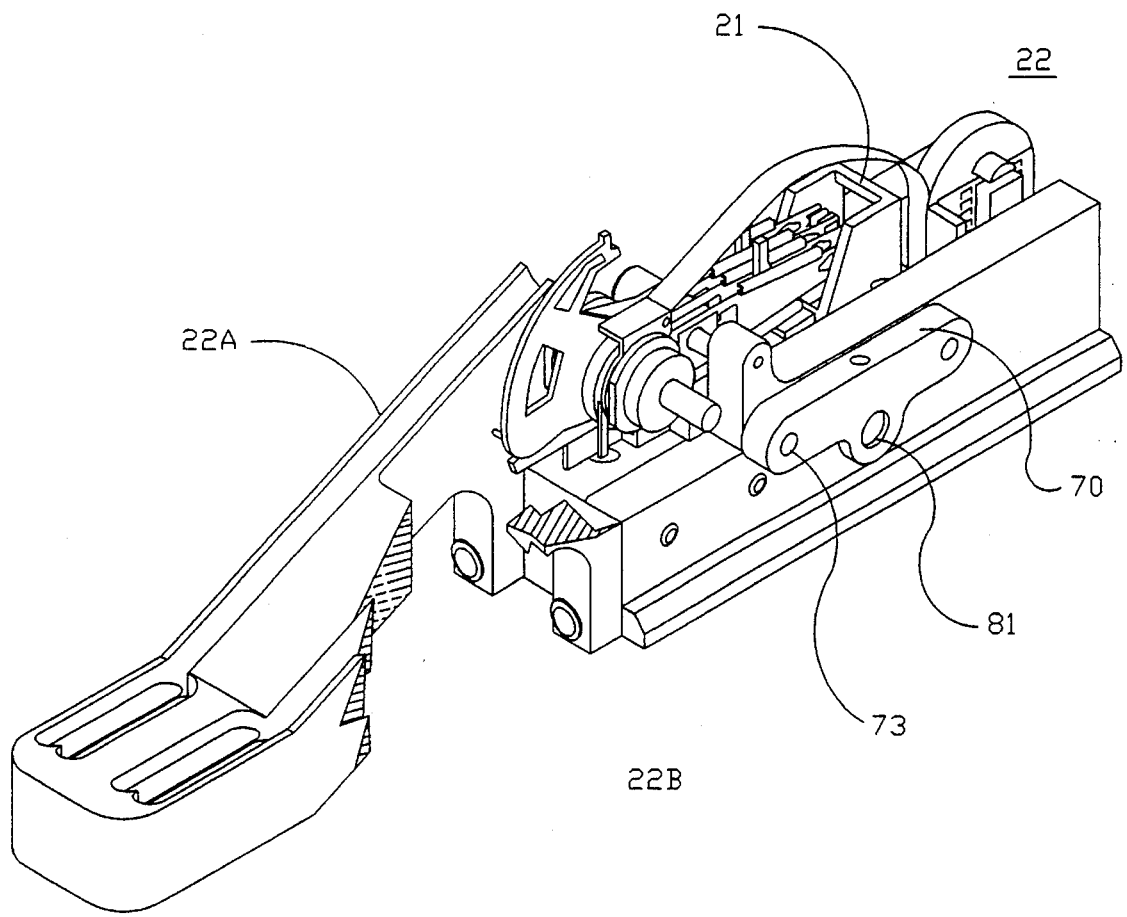
FIG. 3 is a perspective view, partly broken away, of the components shown in FIG. 2 after assembly.

FIGS. 2 and 3 illustrate the various head stack components that are assembled in accordance with the method of the present invention. The individual components are best seen in the exploded view of FIG. 2 while FIG. 3 illustrates the location of the various components relative to a component caddy 21 and caddy base 22.

With reference first to FIG. 2 the components of the head stack include the pivot bearing assembly 23 which includes the spindle 24 and the pivot bearing 25. The end 26 of the spindle 24 may be provided with threads for mounting the spindle 24 to the base plate 11 in FIG. 1

The next component is the head arm assembly 30 which includes a magnetic transducer 31, gimbally mounted to the flexure arm portion 32 which is attached and integral with the uni-mount section 33. Section 33 includes an opening 34 through which the bearing 25 is inserted so that the axis 35 of opening 34 and the axis 26 of spindle 24 coincide.

The next component is the spacer ring 40 which has an opening 41 similar to opening 34. The function of ring 40 is to maintain a predetermined spacing between the pair 42 of head arm assemblies 30 and 45 disposed on either side of the ring 40 when the components are clamped on the bearing 25. As shown in FIG. 2 the pair of arm assemblies include arm assembly 30 described above and arm assembly 45 which is the mirror image of assembly 30 and hence needs no separate detailed description.

The flat coil assembly member 50 is the next sequential component. Member 50 is part of the rotary actuator in that it includes a flat coil that is positioned in a magnetic flux field of the actuator. During operation, current supplied to the coil from the system, causes the pivoting action of the head stack about the axis 26. Member 50 includes an opening 51 through which the bearing assembly 23 is inserted. The member 50 is provided with a reference surface 52 which cooperates with a mating surface to accurately locate the angular position of member 50 on the bearing assembly 23. A projection from the caddy base which is described later is used in the preferred embodiment to perform the angular referencing function on member 50.

The pair 55 of head arm assemblies 56 and 57 are substantially identical to pair 42 of head arm assemblies 30 and 45.

The last component of the head stack is the flex assembly 60 which includes the ribbon conductor 61, the flex bracket 62 holding the connector block 63 and the flex mounting bracket 64. Connector block 63 functions to provide signal connections from the system to the flat coil and to the magnetic heads. The mounting bracket 64 includes an opening 65 through which the pivot assembly 25 is inserted.

The head stack components are clamped on the bearing assembly by nut 66 which engages the threads 67 on the end of the pivot bearing 25. The automatic insertion of the spindle assembly 23 through the various openings in the components and the tightening of the nut 66 are detailed later in the specification in connection with the description of FIG. 5.

As shown in FIG. 3 the component caddy 21 during the assembly process is removably positioned in the caddy base 22. Caddy base 22 may be provided with a removable extension 22A which is attached to base 22 by means of bolts 22B. Member 22 holds the flex connector bracket 62 out of the way until after the components are assembled. Component caddy 21 serves the dual purpose of holding the components in precise alignment for insertion of the spindle assembly and serves as a shipping caddy after the components have been clamped and the caddy 21 is removed from the base 22.

The mechanism which functions to affix caddy 21 to base 22 is shown best in FIG. 2. As shown, the mechanism comprises a yoke member 70 which includes a pair of pins 71 and locking balls 72 which are disposed in cylindrical recess 73. The recess 73 extends completely through the vertical side 74 of the base 22. The diameter of the recess 73 is reduced slightly on the inside wall of side 74 to permit each locking ball 72 to extend past the inside wall only the amount necessary to engage the respective recess 76 and to bias the caddy 21 towards the opposite side wall 77 of base 22. Yoke member 70 is biased toward the wall 74 by means of the spring 78 and release pin 79. Pin 79 extends through cylindrical recess 80 so that the end of the pin is disposed in opening 81 and is firmly attached thereto by a set screw 82. The spring 78 is normally compressed so that it forces the pin 79 in the direction of arrow 83.

Prior to the start of the assembly operation, the operator presses the release pin 79 as an empty caddy is placed in the base. Pressing the pin 79 allows the locking balls 72 to easily engage in the recesses 76 in the caddy 21 thereby completing the holding action. After the components are assembled the operator releases the caddy 21 by pressing the release pin 79 in the direction opposite to arrow 83 and lifts the caddy out, at which point the assembly caddy thereafter functions as the shipping caddy.

As shown in FIG. 2, a vertically disposed spacer pin 90 is mounted in base 22. Pin 90 is disposed normal to the the horizontal axis of the various openings in the components through which the pivot bearing is inserted. The function of spacer pin 90 is to provide a reference point for spacer ring 58 associated with head arm pair 55 during the assembly process to ensure that the axis of the spacer 58 is in alignment with the axes of the other components.

A head arm separator pin 95 also is mounted to the base in a fashion similar to pin 90. Separator pin 95 functions to separate the head arm assemblies 45 and 55 when they are initially loaded into the caddy and permit the subsequent insertion of the flat coil member 50 between the two head arm assemblies.

Figure 4:
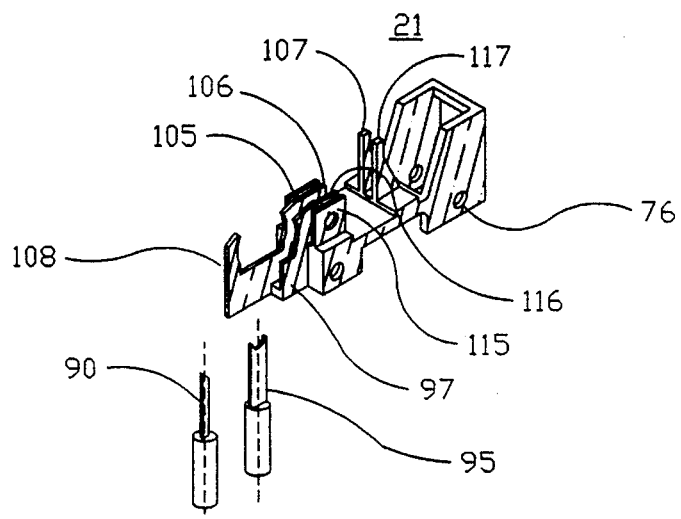
FIG. 4 is a perspective view of the caddy.
Figure 4A:
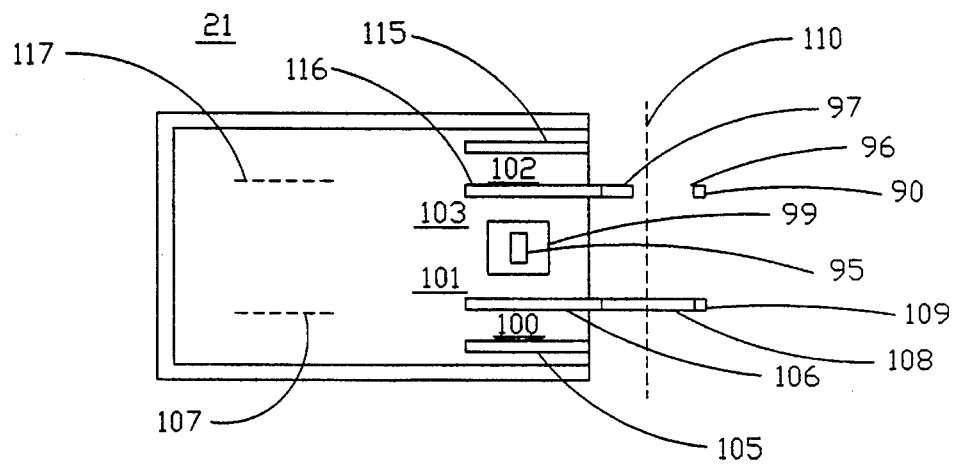
FIG. 4A is a plan view of the caddy shown in FIG. 4.

The functional details of the component caddy 21 and pins 90 and 95 mounted on the caddy base are best shown in FIG. 4. As shown, the caddy 21 includes a slot 100 for receiving head arm assembly 30 and a slot 102 for receiving head arm assembly 45. The function of each slot is to position a head arm assembly on edge so that the axis of opening 34 is in a fixed position relative to the caddy. The function is achieved by precise spacing of the vertically extending sections, e.g. 105–107, such that the width of the slot defined by these projections is slightly less than the width or crown height of the arm assembly when the assembly is in an unbiased state. The act of placing the arm assembly in the slot results in the ends of the head arm assembly being biased against the projections which define the slot. The bias force is sufficient to maintain the position of the assembly selected by the operator, while allowing the operator to readily adjust the position of the arm assembly.

The projections that define the vertically disposed slot 100 comprise projections 105, 106 and 107. Projections 105 and 106 are located opposite each other at the end of the slot 100 remote from fence 104 for the magnetic transducers, shown in FIG. 4. A fence 104 extends around the end area of the caddy where the magnetic transducers are located to protect these items from damage during subsequent shipping and handling.

Projection 106 as shown includes an extension 108 which includes a semicircular reference edge 109 for positioning the center of the spacer ring 40 along the imaginary reference axis 110 which extends from axis 26, as illustrated in FIG. 2. The third projection 107 disposed toward the end of the slot that receives the transducer, functions to maintain a predetermined spacing between the air bearing surface of the transducer 31 of assembly 30 and the air bearing surface of the transducer of arm assembly 45.

A similar set of projections 115, 116 and 117 define slot 102. Slot 102 is similar to slot 100 except that projection 116, which is located similarly to projection 106 for slot 100, does not have the full extension 108. Instead a pin 90 mounted on the base 22 provides a support surface 96 which together with short extension 97 provides for positioning the spacer 58 on the axis 110.

The head arm assembly 45 is positioned in a slot 101 which is similar to slot 100. Slot 101 is defined by the opposite sides of projections 106 and 107 which are common with slot 100. The separator pin 95 extending from the base 22 is inserted through an opening 99 in the floor of caddy 21 located in the space between projection 106 and projection 116. Head arm assembly 45 is inserted in the slot defined by projection 106, one side of pin 95 and projection 107. The corresponding head arm assembly 56 of head arm pair 55 is positioned in a similarly defined slot 103. This slot 103 is defined by the other side of pin 95, projection 116 and projection 117. Separator pin 95 maintains a space between the head arm assemblies 56 and 45 which are disposed back to back in slots 101 and 103. This permits the subsequent insertion of the flat coil member 50 between the two arm assemblies. The biasing action of the ends of the arm assemblies provides a light clamping force on the coil member.

Figure 5:
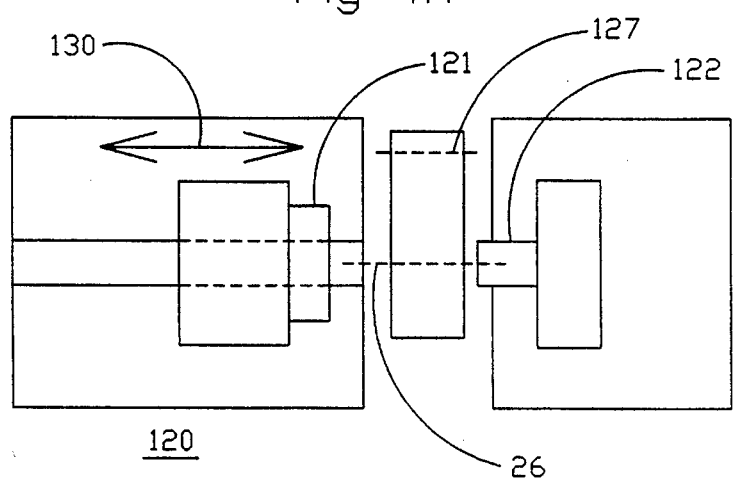
FIG. 5 is a schematic view of the bearing insertion and component clamping fixture used for automatically inserting the pivot bearing into the respective bearing receiving openings of the aligned components prior to clamping.

FIG. 5 is a schematic representation of a fixture 120 that may be employed for inserting the pivot bearing 23 (FIG. 2) through the aligned openings in the head stack components that have been positioned in the component caddy 21. The fixture 120 includes a clamping means, such as a chuck mechanism 121, for grasping the pivot bearing 23 so that its pivot axis 26 is horizontally disposed. The chuck mechanism 121 is movable horizontally in a direction parallel to the pivot axis 26. A similar type chuck mechanism 122 is employed to grasp the clamping nut 110 . The chuck mechanism 122 holding the clamping nut 110 is adapted to rotate the nut on the axis of the pivot bearing 23.

The fixture 120 is adapted to position the caddy base 22 so that the openings in the aligned components are coaxial with the pivot bearing 23. The chuck mechanism 121 holding the pivot bearing 23 is moved horizontally in a direction toward the chuck mechanism 122 holding the nut 110. The threaded end of the bearing 23 is inserted through the aligned openings in the components until it reaches the clamping nut 110. The chuck mechanism 122 holding the clamping nut 110 is then rotated which clamps the components together for conjoint movement with the flat coil member 50. The rotation of the nut is suitably controlled to provide the desired clamping force on the components. Once the components are suitably clamped the component caddy can be released from the base and the head stack transported to the disk drive assembly line.

The fixture 120 may also function to align all of the head arm assemblies angularly on the bearing member relative to the flat coil member. In this regard, each of the head arm assemblies 30, 45, 56 and 57, as shown in FIG. 2, is provided with an alignment hole which is positioned in the transducer end of the assembly. A tapered alignment pin represented by arrow 130 in FIG. 5 is movable in a direction parallel to the axis 26 of bearing member 23 to engage each of the alignment holes. Once the alignment pin 130 is engaged with each of the holes, the transducers are all aligned relative to each other, and are in the correct angular position on the bearing member 23.

The correct angular positioning of the flat coil member 50 on the bearing 23 is obtained by applying a slight counterclockwise biasing force on the coil member to ensure that a reference edge 52, as shown in FIG. 2, is snug against the top of spacer pin 95. The components are then in position to be clamped by fixture 120.

Figure 6A:
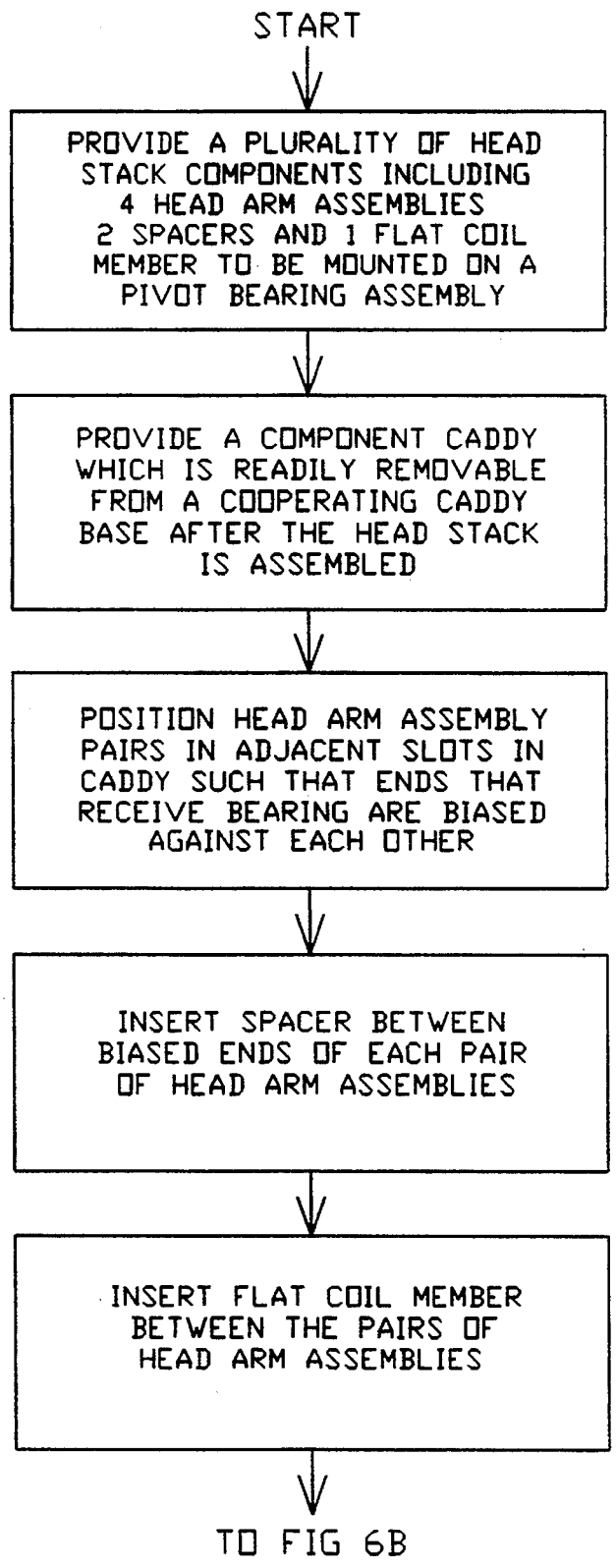
FIGS. 6A and 6B constitute a flow chart setting forth the various steps in the assembly process.
Figure 6B:
Figure 6B:
Figure 6B:

FIGS. 6A and 6B comprise a flow chart setting forth the sequence of steps involved in the method of the present invention. The flow chart is self-explanatory when read in connection with the above detailed description of the head stack components and the function of the caddy and caddy base combination.

What is claimed is:

1. A method of assembling a head stack on a pivot bearing for use in a magnetic head positioning mechanism of a disk file in which said head stack comprises a plurality of different components disposed on an axis common to said bearing, said method comprising the steps of:

providing a plurality of head stack components each of which has an opening for receiving said bearing, including at least one pair of head arm assemblies and a flat coil member which is moved by said mechanism, providing a component caddy for holding said components with said openings disposed on said common axis, placing said head stack components in said caddy with said openings disposed on said common axis, aligning selected ones of said head stack components angularly on said common axis, inserting one end of said pivot bearing through said openings to position the axis of said bearing on said common axis, and clamping said components on said bearing for conjoint movement with said flat coil member.

2. The method set forth in claim 1 in which said bearing is formed with threads and in which said step of clamping includes the further steps of:

providing a threaded nut, and threading said nut on said threaded bearing until a predetermined clamping force is obtained on said head stack components in an axial direction.

3. The method set forth in claim 2, in which said step of providing said caddy includes the step of providing a plurality of projections which extend vertically from the bottom surface of said caddy and which are spaced relative to each other to define a plurality of slots, each of which is adapted to receive one head arm assembly in an on edge position, and said step of placing includes the further step of positioning one of said head arm assemblies in respective ones of said slots with an end of said one head arm assembly being self biased against a corresponding end of an adjacent head arm assembly.

4. The method set forth in claim 3, in which said step of providing projections includes the step of forming one of said projections which is common to adjacent slots for preventing the said ends of said arm assemblies from coming in contact, and said step of placing includes the further step of placing a spacer component between the biased ends of said assemblies.

5. A method of assembling a head stack on a pivot bearing for use in a magnetic head positioning mechanism of a disk file in which said head stack comprises a plurality of different components disposed on an axis common to said bearing, said method comprising the steps of:

providing a plurality of head stack components, each of which has an opening for receiving said bearing, including two pairs of head arm assemblies and a flat coil member which is moved by said mechanism, supplying a component caddy and removable caddy base for holding said components with said openings disposed on said common axis, placing said two pair of head arm assemblies in said caddy first with said openings disposed on said common axis, separating the head arm assembly of one pair from the corresponding head arm assembly of the other pair of head assemblies to facilitate the subsequent placement of said flat coil member between said two pairs of head arm assemblies, placing said flat coil member in said caddy between said two head arm assemblies, inserting one end of said pivot bearing through said openings to position the axis of said bearing on said common axis, and clamping said head stack components on said bearing for conjoint movement with said flat coil.

6. The method set forth in claim 5, in which said one end of said bearing is provided with threads and in which said step of clamping includes the further steps of:

providing a threaded nut, threading said nut on said threaded end of said bearing and applying a predetermined clamping force on said head stack components in an axial direction.

7. The method set forth in claim 6, in which said step of supplying includes extending a separator projection from said caddy base through an opening in the bottom of said caddy disposed midway between said two pair of assemblies to maintain one arm assembly of each said pair in an adjacent spaced relationship relative to each other, and said step of inserting includes inserting a flat coil member having a thickness greater than the thickness of said separator projection to permit said flat coil member to be held in a position normal to said common axis by said assemblies, and supporting an edge of said flat coil member on the distal end of said separator projection to position the opening of said member coaxially with said common axis.

8. The method set forth in claim 7, in which said step of supplying includes extending another projection from said caddy base to assist in positioning a spacer disposed between said pair of head arm assemblies relative to said common axis prior to said step of inserting.

9. The method set forth in claim 8, including the step of aligning said head arm assemblies relative to each other prior to threading and clamping said components together, by placing an alignment pin through an alignment opening in each of said head arm assemblies.

* * * * *